(No Model.)
J. F. WILLIAMS.
MANUFACTURE OF LARD.
No. 247,141. Patented Sept. 13, 1881.
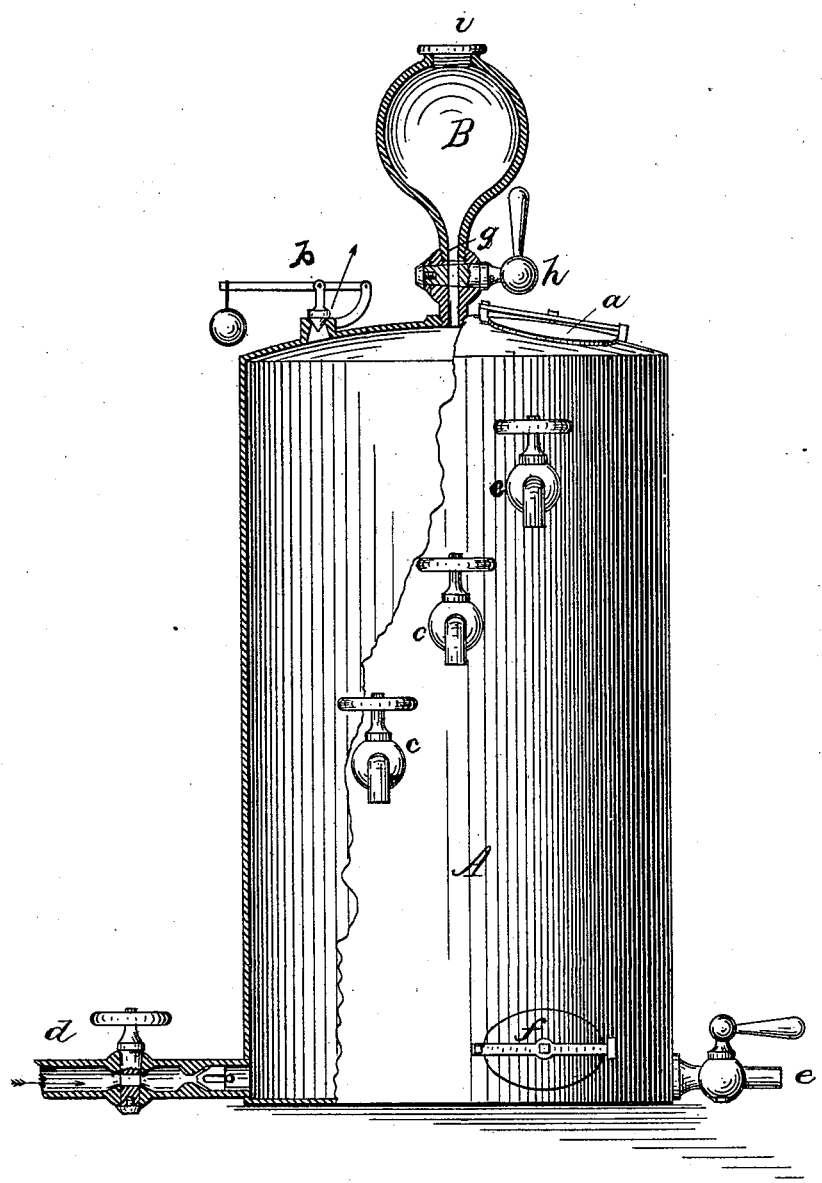

UNITED STATES PATENT OFFICE.

JOHN F. WILLIAMS, OF ST. LOUIS, MISSOURI.

MANUFACTURE OF LARD.

SPECIFICATION forming part of Letters Patent No. 247,141, dated September 13, 1881.

Application filed August 10, 1881. (No model.)

*To all whom it may concern:*

Be it known that I, JOHN F. WILLIAMS, a citizen of the United States of America, residing at St. Louis, in the county of St. Louis and State of Missouri, have invented certain new and useful Improvements in Manufacture of Lard; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists in an improved process for the manufacture of lard in which a purifier is introduced into the lard while it is still under steam-pressure; and it further consists in the mechanism employed in carrying out said process, and which is fully illustrated in the accompanying drawings.

A is a tank of ordinary construction. It is of sufficient strength to sustain a steam-pressure of forty or fifty pounds to the square inch, and holds the crude fatty matter from which the lard is manufactured. It is provided with a man-hole, $a$, through which the substance enters the tank, a safety-valve, $b$, to prevent rupture from high steam-pressure, faucets $c\ c\ c$, through which the manufactured lard is drawn from the tank, steam-pipe $d$, which conveys steam into the tank in the process of manufacture, bottom cock, $e$, through which the water is drawn off after the operation is completed, and man-hole $f$, through which the refuse matter—bones, meat, &c.—are removed. Upon the top of the tank is a steam-tight receptacle, B, which contains the mixture for purifying the lard. This mixture may be composed of sal-soda, alum, or any kindred substance. I prefer sal-soda because of its cheapness and the high quality of lard resulting from its use. It is connected with the tank A by a pipe, $g$, through which is the valve $h$, for the purposes hereinafter to be explained. The top of the receptacle B is open and provided with a cap, $i$.

My new process of manufacturing lard, and in which I use the above-described tank and receptacle, is as follows: The tank is nearly filled with fatty matter through the man-hole $a$. The purifying substance—usually sal-soda—is placed in the receptacle B, and is prevented from entering the tank by closing the valve $h$. Steam at a pressure of from forty to fifty pounds to the square inch is then let into the tank through the pipe $d$. After the mass has been thoroughly melted and the lard separated from the bones, meat, water, &c., steam is cut off from the tank, the safety-valve $b$ is opened, and the steam allowed to escape until the pressure is reduced to between one and five pounds to the square inch, which may be ascertained by a steam-gage placed upon the tank. The valve $h$ is then opened, the steam passes through the pipe $g$ into the receptacle B, mixes with the purifier contained therein, heats it, and allows it to flow into the tank A, where it thoroughly commingles with the lard and completes the process of manufacture. The lard is then drawn off through the faucets $c\ c\ c$.

By this process of introducing the purifier into the tank while the steam-pressure is still upon the lard it will mix more thoroughly, accomplish its purpose more perfectly, and produce a lard of finer quality than any now in use.

The receptacle B is made of sufficient strength to sustain an equal steam-pressure with the tank A, and forms an air and steam tight connection therewith.

What I claim as new is—

1. The improved process for the manufacture of lard, consisting in the introduction of the purifying substance while the lard is still under pressure, substantially as set forth.

2. The receptacle B, fixed to the top of the tank A, forming a steam-tight joint therewith, and adapted to receive a purifying substance, and provided with a pipe, $g$, and valve $h$, through which said purifier enters the tank A, substantially as set forth.

In testimony whereof I affix my signature in presence of two witnesses.

JOHN F. WILLIAMS.

Witnesses:
FENNER SAUNDERS,
W. J. OSGOOD.